US009113202B1

(12) United States Patent
Wiseman et al.

(10) Patent No.: US 9,113,202 B1
(45) Date of Patent: Aug. 18, 2015

(54) INVERTED CLIENT-SIDE FINGERPRINTING AND MATCHING (75) Inventors: Matthew Wiseman, San Francisco, CA (US); Matthew Sharifi, Zurich (CH); Yaniv Bernstein, Zurich (CH); Annie Chen, Thalwil (CH); Dominik Roblek, Ruschlikon (CH)

(73) Assignee: Google Inc., Mountain View, CA (US)

( * ) Notice: Subject to any disclaimer, the term of this patent is extended or adjusted under 35 U.S.C. 154(b) by 455 days.

(21) Appl. No.: 13/239,138

(22) Filed: Sep. 21, 2011

(51) Int. Cl.
H04N 21/439 (2011.01)
H04L 7/08 (2006.01)
H04N 21/84 (2011.01)

(52) U.S. Cl.
CPC .............. H04N 21/4394 (2013.01); H04L 7/08 (2013.01); *H04N 21/84* (2013.01)

(58) Field of Classification Search
CPC ...... H04N 21/4394; H04N 21/84; H04N 7/08
USPC .......................................................... 709/217
See application file for complete search history.

(56) References Cited

U.S. PATENT DOCUMENTS

| 7,991,770 | B2 | 8/2011 | Covell et al. | |
| 2005/0177372 | A1* | 8/2005 | Wang et al. | 704/273 |
| 2008/0208891 | A1* | 8/2008 | Wang et al. | 707/102 |
| 2008/0250120 | A1* | 10/2008 | Mick et al. | 709/219 |
| 2008/0256115 | A1* | 10/2008 | Beletski et al. | 707/102 |
| 2009/0100469 | A1* | 4/2009 | Conradt et al. | 725/46 |
| 2009/0154806 | A1* | 6/2009 | Chang et al. | 382/173 |
| 2010/0166250 | A1* | 7/2010 | Zhang | 382/100 |
| 2010/0205174 | A1* | 8/2010 | Jiang et al. | 707/725 |
| 2011/0022638 | A1* | 1/2011 | Jiang | 707/797 |
| 2012/0029670 | A1* | 2/2012 | Mont-Reynaud et al. | 700/94 |

OTHER PUBLICATIONS

Google Inc., "IntoNow—Apps on Android Market," 2011, 2 Pages, [online] [retrieved on Dec. 30, 2011] Retrieved from the internet <URL:https://market.android.com/details?id=com.intonow &hl=en>.

\* cited by examiner

*Primary Examiner* — Oleg Survillo
*Assistant Examiner* — Joseph M Cousins
(74) *Attorney, Agent, or Firm* — Amin, Turocy & Watson, LLP (57) ABSTRACT

A technique for inverted client side fingerprinting and matching provides the benefits of disposable fingerprinting to identify multiple content streams from multiple clients without overloading a fingerprinting system. Rather than tasking a fingerprinting system with the generation and comparison of all fingerprints, the technique distributes some fingerprinting tasks to the clients receiving the content streams. As a result, the fingerprinting system is not bottlenecked by fingerprinting tasks. In one embodiment, the fingerprinting system can provide additional services to the clients.

14 Claims, 4 Drawing Sheets

INVERTED CLIENT-SIDE FINGERPRINTING AND MATCHING

BACKGROUND OF THE INVENTION

1. Field of the Invention

The present application is related to content stream fingerprinting and, more particularly, to matching fingerprints to identify the content being streamed.

2. Description of the Background Art

One technique for identifying digital content (e.g., video, audio, or other media content) in the absence of dedicated identifying information (e.g., metadata) is known as fingerprinting. Fingerprinting involves deriving a small piece of data, known as a fingerprint, from the original content. The fingerprint identifies the source content. Generally, no two fingerprints are the same. Fingerprints are useful for determining whether one item of content is the same or different from another item of content by comparing their respective fingerprints, rather than comparing the data of the content items themselves. The small size of fingerprints makes them efficient to store in bulk and efficient to compare against other fingerprints.

Fingerprinting has drawbacks, however. The initial generation of fingerprints from the original content is a processing intensive task, and is typically more processing intensive than comparing fingerprints. As a result, a fingerprinting system can be overloaded if it must rapidly generate fingerprints for a large number of content items. Further, even though fingerprint comparison between two fingerprints is comparatively efficient from a processing standpoint, even fingerprint comparisons can be processor intensive if there are a large number of comparisons to be performed. These problems may be mitigated by adding more fingerprinting systems to perform all of the necessary processing, however this solution adds significant costs to a fingerprinting system.

For these reasons, fingerprinting systems tend to work best where the fingerprints can be generated and matched offline. This reduces the need for increased hardware to support to support fingerprinting volume. In addition, fingerprinting systems also benefit where the fingerprints can be generated and then stored and used multiple times to identify content. In this case, the processing costs of fingerprint generation are be mitigated by the fact that the fingerprints are be reused multiple times and do not need to be regenerated.

There are many situations, however, where it is useful to identify the content in a real time data stream. For example, it may be desirable to monitor a real time content stream being received by user to identify what programs the user is watching. One current approach to this problem relies on sampling the content being captured in the user's viewing environment, and transmitting the sample back to a fingerprinting system at a remote server, which then generates the fingerprints from the samples, and compares them with reference fingerprints of reference content. As can be appreciated, in large scale systems there may be millions of users receiving content streams that would need to be monitored, the samples received, and fingerprints generated by the server in this manner. Such a system would require a very large number of fingerprinting systems at the server to accommodate the expected fingerprinting volume.

SUMMARY OF THE INVENTION

A system and methodology provide for inverted client side fingerprinting and matching provides the benefits of identifying large numbers of real time content streams from multiple clients without overloading a fingerprinting system. Rather than tasking a fingerprinting system with the generation and comparison of all fingerprints, clients receiving the content streams generate the fingerprints, and provide the generated fingerprints to a fingerprinting system for initial comparison and identification. As a result, the fingerprinting system is not overloaded by fingerprint generation tasks. This methodology enables a very large number of clients to identify real time content streams concurrently, while employing a relatively small number of fingerprint generation systems.

In one implementation, a client device samples a content stream received at a reception device from a content provider and playback in a user's environment. For example a user's television or set top receiver may be tuned to a channel to receive a broadcast program and to play it back, and the client device is configured to sample the audio content of the received program. The client device generates fingerprints for a discrete window of time of the sampled stream content, for example generating a fingerprint for a 1 second window of a program. The client device transmits the fingerprints to a fingerprinting system. The fingerprinting system maintains a database of reference fingerprints that are associated with various instances of content. The fingerprinting system identifies the stream being received at the client by matching the fingerprint received from the client with a reference fingerprint from a fingerprint database. This match identifies the particular content stream (e.g., television program) that the user is currently watching.

Having identified the current content stream, the fingerprinting system periodically or intermittently transmits to the client device additional reference fingerprints corresponding to later windows of time from the matched stream. As the stream is progressively received, the client continues to sample the stream and generate fingerprints, and locally compare these fingerprints against the reference fingerprints it receives from the fingerprinting system. As long as the fingerprints match, e.g., the user does not change the television channel, the client and fingerprinting system continue this portion of the process, with the client sampling, generating, and comparing fingerprints locally, and the fingerprinting system providing the client with reference fingerprints for comparison.

If the fingerprints do not match, for example when the user changes the television channel or a new program comes on, the client transmits the mismatched fingerprint it has generated to the fingerprinting system. The fingerprinting system finds another reference fingerprint that is a match for this fingerprint, thereby identifying the stream of content the user is now watching. Having identified the new content stream being received by the user, the fingerprinting system resumes communicating subsequent reference fingerprints for the new content stream to the client, where the fingerprints correspond to later content windows of the newly identified content stream.

This technique serves to offload fingerprinting responsibilities from the fingerprinting system hosting the fingerprint database. The client, as opposed to the fingerprinting system, is tasked with fingerprint generation and some of the fingerprint comparisons. This additional processing load at the client is minimal because the client is only generating and comparing fingerprints for its own streams, rather than for other clients as well.

In one implementation, the identification of the content stream may be used by a relevant content system to provide the client with additional information that is relevant to the identified content stream. For example, if the user is watching a particular sporting event such as a baseball game, the relevant content system can provide supplemental information such as player statistics, videos of prior games, player interviews, and the like.

The features and advantages described in this summary and the following detailed description are not all-inclusive. Many additional features and advantages will be apparent to one of ordinary skill in the art in view of the drawings, specification, and claims hereof.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture Overview

Figure 1:
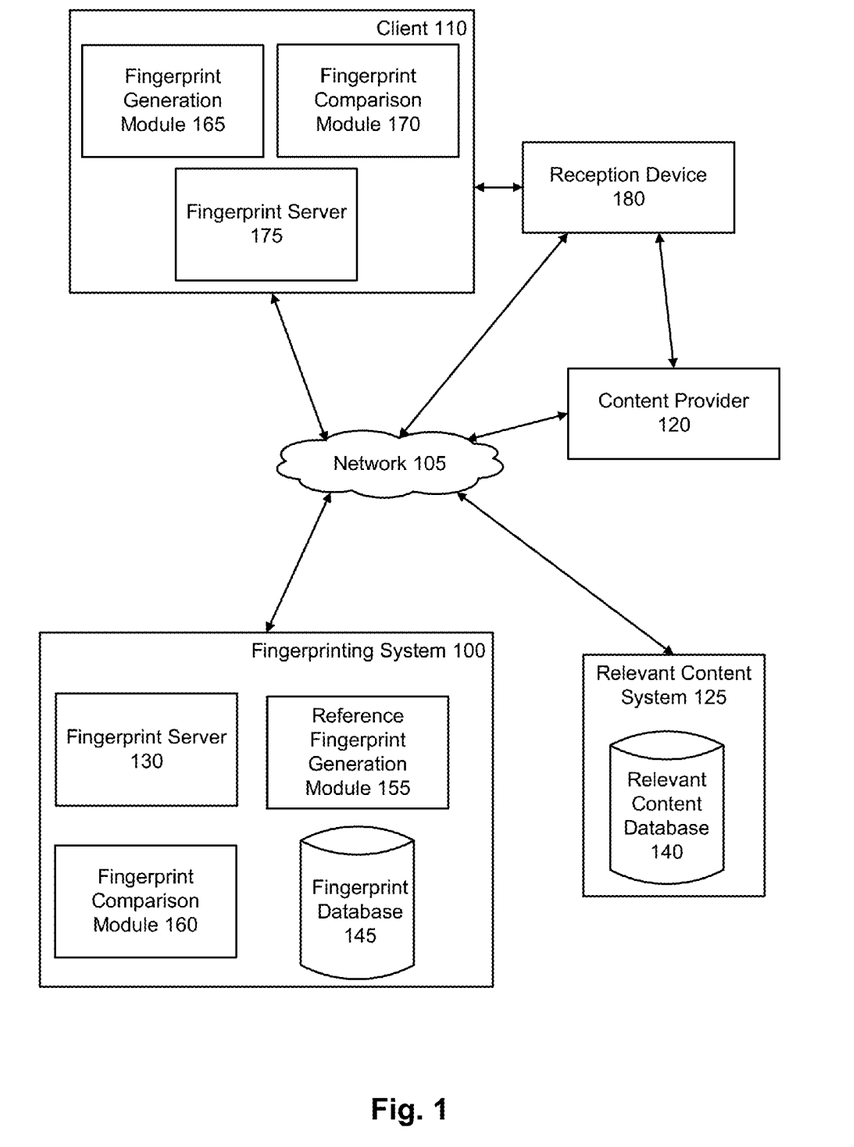
FIG. 1 is a diagram of system architecture according to one embodiment.

A fingerprinting system 100 is communicatively connected to one or more clients 110. The fingerprinting system 100 is configured to cooperate with the client 110 to identify content being received at the client 110, or at another reception device 180 within the same environment as the client 110. If the content being received changes, the client 110 is able to detect the change and communicate with the fingerprinting system 100 to re-identify the new content being received. The division of tasks between the client and the fingerprinting system allows a very large number of clients to identify real time content streams concurrently, while employing a relatively small number of fingerprinting systems. In one implementation, the identification of the content stream is sent to a relevant content system 125 to provide the client 110 with additional content that is relevant to the content stream.

In one implementation, the fingerprinting system offloads fingerprint generation and some fingerprint comparison to the client. If a content stream being received at the client 110 or reception device 180 has not been identified or mismatches what was expected to be received based on a previous identification, the client 110 sends a fingerprint of a window of sampled content to the fingerprinting system 100. The fingerprinting system 100 identifies what content is being received by matching the fingerprint from the client 110 against a database of reference fingerprints 145 correlated with identifying information. Once a content stream is identified, the fingerprinting system 100 sends reference fingerprints of later windows of content for the identified content stream to the client 110. The client 110 then compares these received fingerprints with fingerprints generated for the received content stream. So long as the fingerprints received from the fingerprinting system 100 match the fingerprints generated by the client 110, the fingerprinting system 100 and client 110 continue in this manner. If the content stream has changed and the fingerprints mismatch, the client 110 communicates with the fingerprinting system 100 to re-identify the stream.

FIG. 1 is a diagram of system architecture according to one embodiment. The fingerprinting system 100 communicates with a client 110 via the network 105. The network 105 is typically the Internet, but may also be any network, including but not limited to a LAN, a MAN, a WAN, a mobile, wired or wireless network, a private network, or a virtual private network, and any combination thereof. In one embodiment, the network 105 includes one or more of coaxial cable, direct service line (DSL), fiber optic, or satellite type connections. The client 110 is any type of device that is adapted to access the fingerprinting system 100 over the network 105.

A reception device 180 receives a content stream from a content provider 120. The reception device 180 and content provider 120 may communicate through the network 105, may communicate through one or more other networks, or alternatively they may be more directly coupled. The content provider 120 includes any type of device that is adapted to communicate content streams to the client 110 over the network 105. The content stream may be, for example, media such as audio or video. The reception device 180 may also be configured to output the received content stream in audio or video form. For example, the reception device may be a television, outputting a cable television channel that a user has tuned to. The reception device 180 may also be a radio, or a cable television set top box, for example.

The client 110 is configured to sample the content stream that is received by the reception device 180. For simplicity only one client 110 is shown. In practice there will be numerous clients 110 communicating with the fingerprinting system 100. Examples of devices that may make up the client 110 include, but are not limited to, personal computing devices, mobile phones, remote controls, laptop computers, tablet computers, and devices that receive video programs such as cable or satellite set top boxes. The client 110 may also be configured to control the reception device 180 to control what is displayed by the reception device 180. The client 110 may additionally display or play back any relevant content that it has received from the fingerprinting system 100.

In one embodiment, the client 110 and the reception device 180 are integrated into a single device. This might be the case, for example, if the reception device 180 and the client 110 are integrated into a single computer, or into a single cable television set top box.

The client 110 is configured to perform fingerprinting tasks to assist the fingerprinting system 100 in the identification of received content streams. The client 110 includes a fingerprint generation module 165, a fingerprint comparison module 170, and a fingerprint server 175. The fingerprint generation module 165 is configured to sample a content window of a content stream and generate a fingerprint of the content window. The fingerprint generation module 165 may sample the content stream differently depending upon the embodiment. In one embodiment, the fingerprint generation module 165 may sample an analog audio stream of audio data, and generate fingerprint based on the audio data. For example, if the client 110 includes a tablet computer and/or smart phone, the computer and/or smart phone may sample the content stream by recording, with a microphone, analog audio signals transmitted from a television located in the same environment.

A "fingerprint" contains characteristic information about a content item (e.g., a content stream) that can be used to identify the content item. Generally, a fingerprint is generated by applying a hash-based function to a bit sequence of the content item, generating a fixed-length monolithic bit pattern, the "fingerprint", that uniquely identifies the content item based on the input bit sequence. For example, an audio fingerprint comprises a digital sequence that identifies a fragment of audio. Fingerprints typically have a much smaller size than the original content item and thus may be used as a convenient tool to identify, compare, and search for content items. Fingerprints should be robust and withstand against typical content distortions, noise, digital compression, and filtering. Simultaneously, these exclusive characteristics should also assure minimal false positive and false negative results, which lead to incorrect identification.

Most existing fingerprinting techniques are based on extracting features from a content item. For example, for an audio sample the features may be obtained from the frequency domain of the audio sample. The audio is first segmented into frames, and for every frame a set of features is computed. Among the audio features that can be used are Fast Fourier Transform (FFT) coefficients, Mel Frequency Cepstral Coefficients (MFCC), spectral flatness, sharpness, Linear Predictive Coding (LPC) coefficients, and modulation frequency. The computed features are assembled into a feature vector, which is usually transformed using derivatives, means, or variances. The feature vector is mapped into a more compact representation using algorithms such as Hidden Markov Model or Principal Component Analysis, followed by quantization, to produce the fingerprint. Usually, a fingerprint obtained by processing a single audio frame has a relatively small size and may not be sufficiently unique to identify the original audio sequence with the desired degree of reliability. To enhance fingerprint uniqueness and thus increase the probability of correct recognition (and decrease false positive rate), small sub fingerprints can be combined into larger blocks representing about three to five seconds of audio.

If the client 110 and the reception device 180 are integrated, the fingerprint generation module 165 may digitally sample the content stream more directly, for example by digitally sampling a received content stream. For example, if the client 110 and reception device 180 are integrated into a desktop computer, the received video frames may be digitally sampled by gathering one second's worth of video frames from a memory cache. Alternatively, an integrated client 110 and reception device 180 may convert received content stream in an analog format.

The fingerprint comparison module 170 is configured to compare fingerprints generated with the fingerprint generation module 165 of the received content stream against reference fingerprints received by the fingerprint server 175 of the client 110 from the fingerprinting system 100. If the fingerprints do not match, the fingerprint server 175 of the client 110 sends the generated fingerprint to the fingerprinting system 100.

When matching fingerprints, the fingerprint comparison module 170 is configured to tolerate an amount of noise in the fingerprints generated at the client. For example, if the fingerprint is generated by sampling audio from a microphone, there may be distortions introduced by the microphone itself and other noise from the environment that may affect the fingerprint of the incoming content stream. Two fingerprints are considered a match if the two fingerprints are the same to within the degree of tolerance as determined by the fingerprint comparison module 170.

The fingerprinting system 100 is configured to communicate with the client 110 regarding fingerprints of the received content stream in order to identify what content is being received at the client 110. The fingerprinting system 100 includes a fingerprint server 130, a fingerprint generation module 155, a fingerprint comparison module 160, and a fingerprint database 145. For simplicity, only one fingerprinting system 100 and its constituent modules and databases are shown, but in practice many may be in operation.

The fingerprinting system 100 may be implemented using a single computer, or a network of computers, including cloud-based computer implementations. The computers are preferably fingerprinting system class computers including one or more high-performance CPUs and 1 G or more of main memory, as well as 500 Gb to 2 Tb of computer readable, persistent storage, and running an operating system such as LINUX or variants thereof. The operations of the fingerprinting system 100 as described herein can be controlled through either hardware or through computer programs installed in computer storage and executed by the processors of such fingerprinting systems to perform the functions described herein. The fingerprinting system 100 includes other hardware elements necessary for the operations described here, including network interfaces and protocols, and input devices.

The fingerprint server 130 receives fingerprints from the client 110. The fingerprint server 130 provides the received fingerprints to the fingerprint comparison module 160. The fingerprint comparison module 160 compare the received fingerprint against reference fingerprints stored in the fingerprint database 145 in order to identify the content stream being received at the client 110. Similarly to the fingerprint comparison module 170, the fingerprint comparison module 160 is also tolerant of noise in the fingerprint received by the client in determining which reference fingerprint the received fingerprint matches. The fingerprint database 145 stores reference fingerprints of media content as well as identifying information for the content it is derived from. The fingerprints used by the system may be generated using any known fingerprinting technique. For example, fingerprints may be derived from audio content, video content, metadata content, text content, or any other kind of content.

The reference fingerprints stored in the fingerprint database 145 may be retrieved from another source, or generated by the fingerprinting system 100 itself. Accordingly, the fingerprinting system 100 may include a reference fingerprint generation module 155. The reference fingerprint generation module 155 may generate the reference fingerprints at any time, however in some embodiments it is conducive to generate reference fingerprints offline, to maximize the available resources for identifying content streams received at clients 110. The reference fingerprint generation module 155 may work in conjunction with the content provider 120, to generate reference fingerprints. For example, the content provider 120 may provide the reference fingerprint generation module 155 with content streams, as well as metadata identifying the content streams. The identifying metadata may then be associated with the generated reference fingerprints by the reference fingerprint generation module 155.

The relevant content system 125 determines other media content which is relevant to the content that is being received at the reception device 180. The relevant content system 125 receives an identification of a content stream from the fingerprint server 130, for example the name of a television show, and determines relevant content to provide to the client 110 based on the identification. The relevant content system 125 transmits the relevant content to the client 110 through network 105. U.S. application Ser. No. 12/358,120, filed Jan. 22, 2009, describes techniques for determining relevant content to recommend or provide to the client 110 based on content currently being received. The contents of this application is incorporated by reference herein in its entirety.

A relevant content database 140 stores correlations between relevant items of media content. For example, the relevant content database 140 may store a connection between an episode of the television show and a review of that same episode written and posted on the internet by a popular television critic. The relevant content database 140 may relate many different types of content including, but not limited to, text content (e.g., published articles, reviews, aggregated reviews, websites, comics, books, blogs), social networking system content, other audio content, and/or other video content.

The fingerprint database 145 and relevant content databases 140 may be stored using any type of data storage system, operating on server class computer systems.

Identification of Received Content

Figure 2:
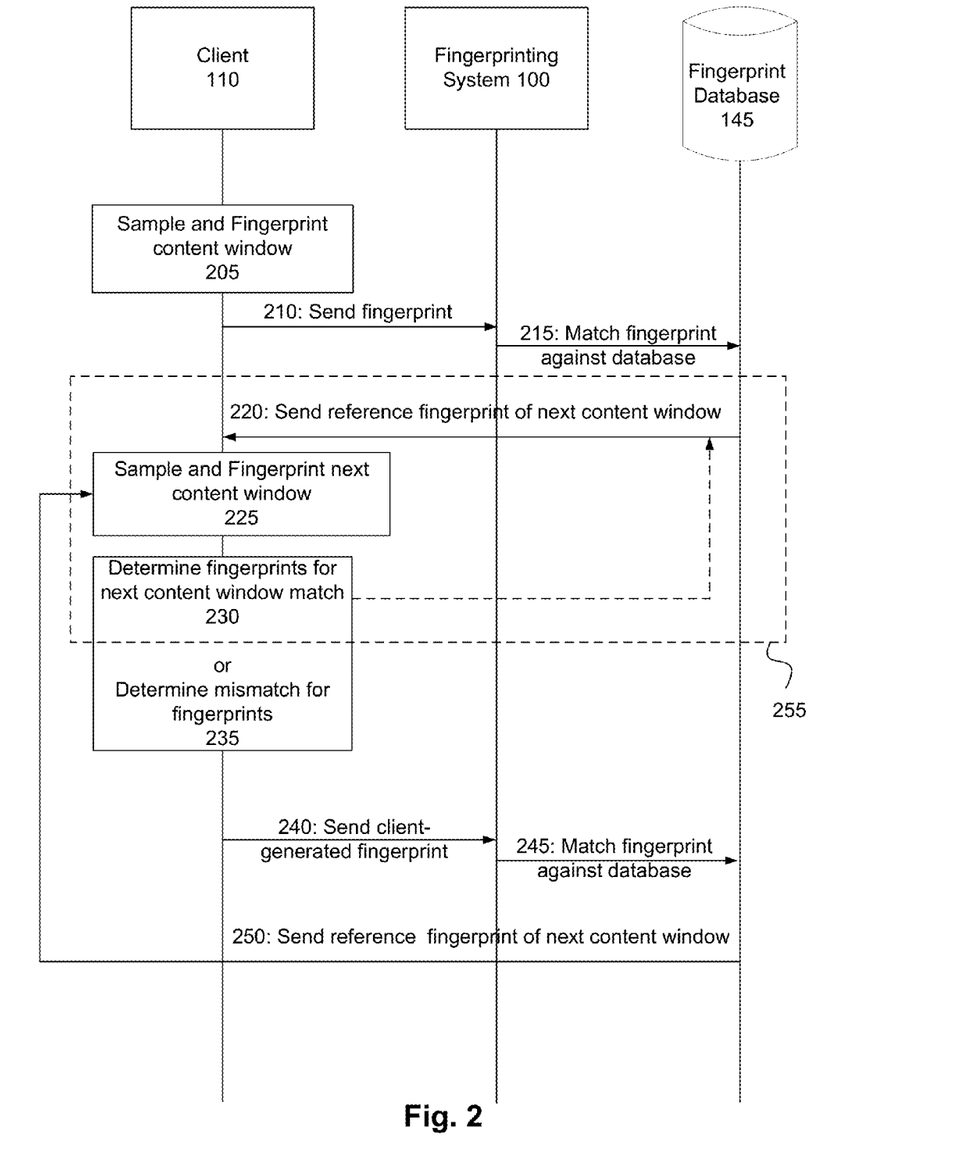
FIG. 2 is an interaction diagram showing a method of client-side fingerprinting and matching, according to one embodiment.

FIG. 2 is an interaction diagram showing a method of client-side fingerprinting and matching, according to one embodiment.

The content stream is streamed by the content provider 120 until the reception device 180 discontinues receiving the stream, or a provider of the stream shuts off the stream. The content stream may include multiple different items of content. For example, the content stream may consist of television shows arriving at the reception device 180 sequentially, one after another. In another example, the content stream may be a radio broadcast. The content stream generally is not required to include separate identifying information or metadata, nor is it required to include separate information or metadata that would identify the boundaries between pieces of content. In some cases, the content stream will include two or more streams of content that are received concurrently at the reception device. For example, the content stream may include an audio content stream that is encoded separately from a video stream. The content stream may also include information to decode and regenerate a decoded version of the content stream.

At 205, the client 110 samples the content stream that is received by the reception device 180. Also shown at 205, the client 110 fingerprints a window of the sampled content stream. The window may be, for example, anywhere from a few milliseconds of content to whole minutes of content. The size of the window may be fixed or variable depending upon the content stream. In one implementation, the content window is of sufficient size so that a fingerprint of the content window will be able to uniquely identify the content in the content stream. The content window size is chosen to be of a size such that the fingerprints generated by the client 110 will be able to match the fingerprints stored in the fingerprint database 145.

There are several different techniques that may be used to ensure that the fingerprints generated by the fingerprint generation module 165 sync up in time with the fingerprints stored in the fingerprint database 145. In one embodiment, the fingerprint database 145 includes an index designed to be invariant to time shifts so that any fingerprint received from the client 110 can be matched to find the identity of the content of the stream, as well as a time offset for what part of the identified content stream the received fingerprint corresponds to.

For example, the fingerprints generated by the fingerprint generation module 165 at the client 110 may create fingerprints of one second long content windows of the received content stream. The fingerprint database 145, in contrast, may contain reference fingerprints that cover ten second intervals, each reference fingerprint starting and ending one second later than the previous reference fingerprint for the same content. Thus, for a given item of content there may be reference fingerprints corresponding to seconds 1-10, 2-11, 3-12, 4-13, etc. In one implementation, each reference fingerprint is correlated in an inverted index with identifying information for the content, which would be the same for all reference fingerprints for that content. Additionally, each reference fingerprint can include offset information for identifying the time offset of the received fingerprint.

The client 110 sends 210 the fingerprint to the fingerprint server 130 located at the fingerprinting system 100. The fingerprint comparison module 160 matches 215 the received fingerprint against the reference fingerprints stored in a fingerprint database 145. If the received fingerprint matches 215 a reference fingerprint in the database 145, the fingerprint comparison module 160 obtains from the fingerprint database 145 identifying information for the content stream. The identification information may include a time offset. The fingerprint server 130 then retrieves the other reference fingerprints associated with the same content stream from the fingerprint database 145. The fingerprint server 130 sends 220 reference fingerprints of subsequent content windows sequentially to client 110, starting with the reference fingerprint of the content window immediately following, with respect to time offset, the content window of the received fingerprint.

The client 110 receives 220 the reference fingerprint of the next content window from the fingerprinting system 100. The client 110 samples and fingerprints 225 the next content window of the received content stream. The client 110 determines 230 whether the reference fingerprint and the newly generated fingerprint match. If the content stream has not changed, the newly generated fingerprint will match the reference fingerprint corresponding to the same content window received from the fingerprinting system 110. If the fingerprints match, the client 110 receives 220 the next content window reference fingerprint from the fingerprinting system 100 and fingerprints the next 225 content window of the received stream. Similarly, the client 110 determines 230 whether the next set of fingerprints match. This process 255 continues so long as the reference fingerprint received from the fingerprinting system 100 matches the fingerprint generated by the client 110.

If the content stream changes, however, the generated fingerprint of the content stream will mismatch the reference fingerprint received 220 from the fingerprinting system 100. This might be the case, for example, if the user changes the television channel, or if the content of the same channel of television changes from one program to another. This may also be the case, for example, if a television program switches over to a commercial in the middle of the program. If the client 110 determines 235 that the generated fingerprint mismatches the reference fingerprint, the client 110 sends 240 the generated fingerprint of a content window of the unrecognized content to the fingerprinting system 100. In one embodiment, the step of determining 235 is automatic if the outcome of the determination 230 is that there is no match between the fingerprints.

The fingerprint server 130 receives 240 the fingerprint from the client 110 and matches 245 the fingerprint against the reference fingerprints stored in a fingerprint database 145. As above for the earlier fingerprint database 145 match 215, if the received fingerprint matches 245 a reference fingerprint in the database 145, the fingerprint server 130 obtains from the fingerprint database 145 identifying information for the content stream. Also as above, the fingerprint server 130 then retrieves the other reference fingerprints for the same content stream. The fingerprint server 130 sends 250 reference fingerprints of subsequent content windows sequentially to client 110.

The process for identifying the content stream received at the client 110 may be described as a two state process. In the first state, the content stream is not identified, and the client 110 communicates a generated fingerprint to the fingerprinting system 100 in order to identify the content stream. Once the fingerprinting system 100 has identified the content stream, the process switches to the second state, in which the fingerprinting system 100 repeatedly sends reference fingerprints of the windows of content expected to be received at the client 110 from the identified content stream. The process remains in the second state as long as the reference fingerprints received from the fingerprinting system 100 match the fingerprints generated by the client 110. If a mismatch is detected, then the content stream is no longer identified, and the process switches back to the first state to reestablish the identification of the content stream.

Providing Relevant Content Based on the Content being Received at the Client

Figure 3:
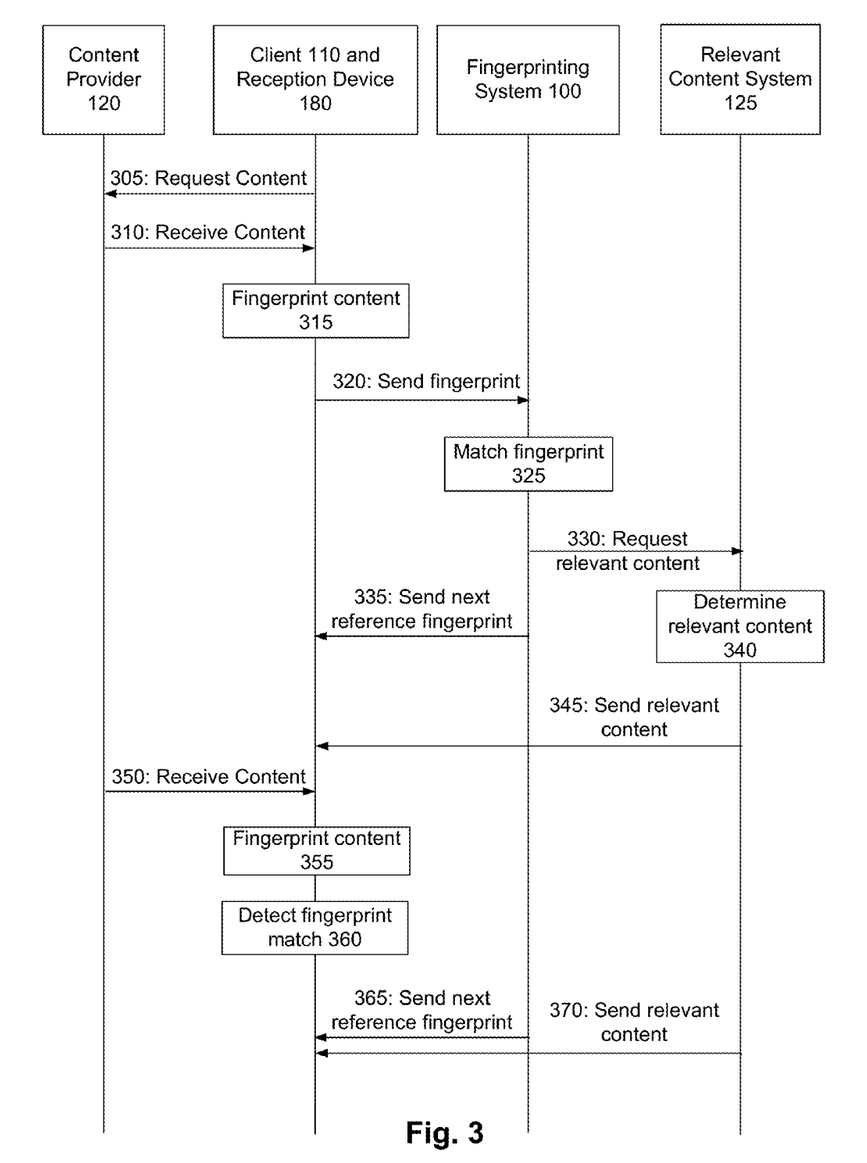
FIG. 3 is an interaction diagram showing a method of providing additional content relevant to a content stream, according to one embodiment.

FIG. 3 is an interaction diagram showing a method of providing additional content relevant to a content stream, according to one embodiment. In the example of FIG. 3, the client 110 and reception device 180 are integrated. The reception device 180 requests 305 a content stream from a content provider 120. The content provider 120 provides the content stream that is received 310 at the reception device 180. The client 110 samples the received content stream and generates 315 a fingerprint of a content window of the received content stream. The client 110 sends 320 the fingerprint to the fingerprinting system 100. The fingerprinting system 100 identifies the content stream by matching 325 the received fingerprint against the fingerprint database 145.

The fingerprinting system 100 communicates the content stream's identification information to the relevant content system 125 to request 330 relevant content from the relevant content system 125. The relevant content system 125 determines 340 relevant content to provide to the client 110 based, at least in part, on the content stream received at the client. The relevant content may be also determined based on the particular window of content or time offset of the content which is being received at the client 110. Thus, the fingerprinting server 130 may also communicate the current content window that is being received at the client or which is expected to be received soon at the client 110. In this manner, the relevant content may be temporally relevant to the content currently being received at the client 110.

The relevant content system 125 sends 345 the relevant content to the client 110. This may occur asynchronously or synchronously with the sending 335 of fingerprints from the fingerprinting system 100 to the client 110. For example, relevant content may be provided each time a new content stream is identified.

Alternatively, relevant content may be provided periodically 370 or intermittently as additional windows of content are received 350 at the client. For example, if the content stream is a movie, the relevant content 370 sent to the client 110 may be relevant to particular portions of the movie as they are presented to a user by the client 110. As new windows of content are received 350 at the reception device 180, the client 110 will continue to generate fingerprints 355 for the received content. In the movie example, subsequent windows of content will be from the same movie, and as a result the client 110 will determine that the generated fingerprints 355 match the reference fingerprints received 335 from the fingerprinting system 100. Since the fingerprints match, the stream identification is current, and the client 110 will continue to receive fingerprints 365 and updated relevant content 370 from the fingerprinting system 100 that is temporally relevant to the content being received.

Figure 4A:
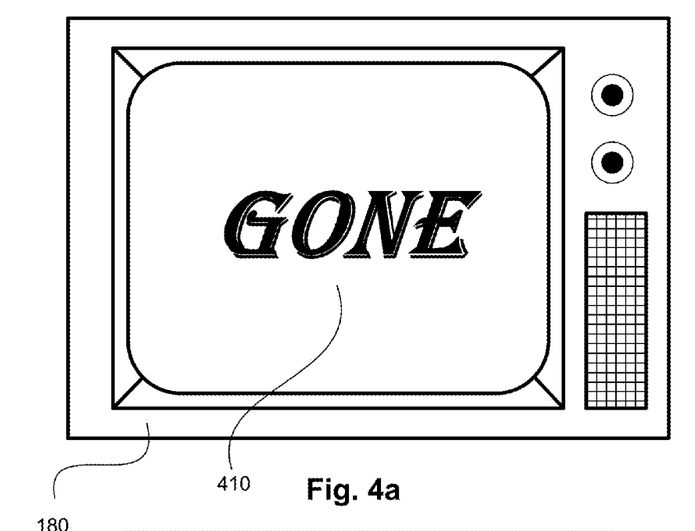
FIGS. 4a and 4b illustrate an example reception device displaying a content stream and an example client displaying additional content relevant to the content stream, according to one embodiment.
Figure 4B:
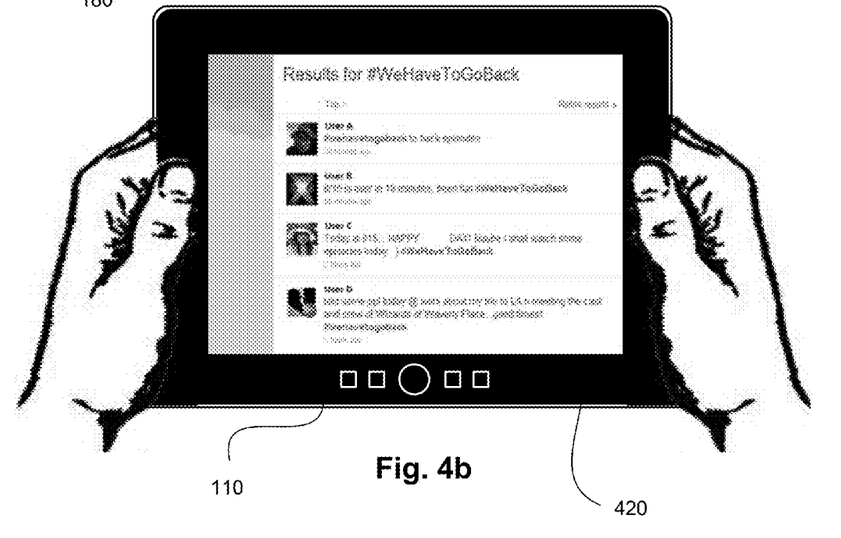

FIGS. 4a and 4b illustrate an example reception device 180 displaying a content stream and additional content relevant to the content stream, according to one embodiment. FIG. 4a illustrates a reception device 180, here a television, displaying the content stream 410 being received by the reception device 180. In this case, the content stream 410 is the "GONE" television show. FIG. 4b illustrates an example client 110, here a tablet computer, displaying additional content relevant 420 to the content stream being received at that reception device 180. In this case, the relevant content 420 is a group text messaging feed created by fans of the television show "GONE". In this example, the tablet computer 110 may be recording audio signals transmitted by the television, which are then converted into fingerprints by a fingerprint generation module 165. The fingerprint generation module 165 may be included in an application stored in a computer readable medium in the tablet computer 110.

Additional Considerations

The present invention has been described in particular detail with respect to various embodiments, and those of skill in the art will appreciate that the invention may be practiced in other embodiments. In addition, those of skill in the art will appreciate the following aspects of the disclosure. First, the particular naming of the components, capitalization of terms, the attributes, data structures, or any other programming or structural aspect is not mandatory or significant, and the mechanisms that implement the invention or its features may have different names, formats, or protocols. Second, the system may be implemented via a combination of hardware and software, as described, or entirely in hardware elements. Third, the particular division of functionality between the various system components described herein is merely exemplary, and not mandatory; functions performed by a single system component may instead be performed by multiple components, and functions performed by multiple components may instead performed by a single component.

Some portions of above description describe the invention in terms of algorithms and symbolic representations of operations on information. These algorithmic descriptions and representations are used by those skilled in the data processing arts to most effectively convey the substance of their work to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware or hardware.

In addition, the terms used to describe various quantities, data values, and computations are understood to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or the like, refer to the action and processes of a computer system, or similar electronic computing device, that manipulates and transforms data represented as physical (electronic) quantities within the computer system memories or registers or other such information storage, transmission or display devices.

The present invention also relates to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well-suited to a wide variety of computer network systems over numerous topologies. Within this field, the configuration and management of large networks include storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

The invention claimed is:

1. A method, comprising:
generating, by a client device including a processor, a first client fingerprint of a first client content window of a content stream;
sending, by the client device over a network, the first client fingerprint to a fingerprinting system that employs a reference fingerprint database having an index that is invariant to time shifts based upon a time period of the first client content window, wherein the fingerprint database comprises reference fingerprints that cover a larger time period than the time period of the first client content window, wherein respective reference fingerprints start and end by an amount of time later than another reference fingerprint for a same content, wherein the amount of time is the time period of the first client content window; and
iteratively performing, by the client device, until it is determined that a switch from the content stream to another content stream has occurred, the following:
  receiving, over the network, a reference fingerprint from the fingerprinting system, the reference fingerprint derived from a reference content window from a matching content stream to the content stream, wherein the reference content window is incremented by a specified time period in the matching content stream from a previous reference content window;
  generating an additional client fingerprint from an additional client content window of the content stream, wherein the additional client content window is different from the first client content window and any other additional client content windows; and
  comparing the additional client fingerprint and the reference fingerprint;
  in response to the additional client fingerprint not matching the reference fingerprint within a specified tolerance, determining that the switch from the content stream to the other content stream has occurred.

2. The method of claim 1, wherein the specified time period is the time period of the first client content window.

3. The method of claim 1, further comprising receiving information relevant to the matching content stream from the fingerprinting system.

4. The method of claim 1, further comprising:
in response to the additional client fingerprint not matching the reference fingerprint within a specified tolerance:
  sending over the network the additional client fingerprint associated with the other content stream to the fingerprinting system.

5. The method of claim 4, comprising:
iteratively performing, by the client device, until it is determined that a switch from the other content stream to a different content stream has occurred, the following:
  receiving, over the network, a new reference fingerprint from the fingerprinting system, the new reference fingerprint derived from a new reference content window from a matching other content stream to the other content stream, wherein the new reference content is incremented by a specified time period in the matching other content stream from a previous new reference content window;
  generating a new additional client fingerprint from an new additional client content window of the content stream, wherein the new additional client content window is different from any other new additional client content windows; and
  comparing the new additional client fingerprint and the new reference fingerprint;
  in response to the new additional client fingerprint not matching the reference fingerprint within the specified tolerance, determining that the switch from the other content stream to the different content stream has occurred.

6. The method of claim 1, further comprising displaying, by the client device, the content stream.

7. A client device, comprising:
a processor; and
a memory communicatively coupled to the processor, the memory having stored therein computer-executable instructions, comprising:
a fingerprint comparison module, when executed by the processor, configured to:
  generate a first client fingerprint of a first client content window of a content stream;
  send the first client fingerprint, over a network, to a fingerprinting system that employs a reference fingerprint database having an index that is invariant to time shifts based upon a time period of the first client content window, wherein the fingerprint database comprises reference fingerprints that cover a larger time period than the time period of the first client content window, wherein respective reference fingerprints start and end by an amount of time later than another reference fingerprint for a same content, wherein the amount of time is the time period of the first client content window; and iteratively perform until it is determined that a switch from the content stream to another content stream has occurred, the following:

receive, over the network, a reference fingerprint from the fingerprinting system, the reference fingerprint derived from a reference content window from a matching content stream to the content stream, wherein the reference content window is incremented by a specified time period in the matching content stream from a previous reference content window;

generate an additional client fingerprint from an additional client content window of the content stream, wherein the additional client content window is different from the first client content window and any other additional client content windows; and compare the additional client fingerprint and the reference fingerprint;

in response to the additional client fingerprint not matching the reference fingerprint within a specified tolerance, determine that the switch from the content stream to the other content stream has occurred.

8. The client device of claim 7, wherein the specified time period is the time period of the first client content window.

9. The client device of claim 7, wherein the fingerprint comparison module is further configured to receive information relevant to the matching content stream from the fingerprinting system.

10. The client device of claim 7, wherein the fingerprint comparison module is further configured to, in response to the additional client fingerprint not matching the reference fingerprint within a specified tolerance, send the additional client fingerprint associated with the other content stream to the fingerprinting system.

11. The client device of claim 10 wherein the fingerprint comparison module is further configured to iteratively perform until it is determined that a switch from the other content stream to a different content stream has occurred, the following:

receive, over the network, a new reference fingerprint from the fingerprinting system, the new reference fingerprint derived from a new reference content window from a matching other content stream to the other content stream, wherein the new reference content is incremented by a specified time period in the matching other content stream from a previous new reference content window;

generate a new additional client fingerprint from an new additional client content window of the content stream, wherein the new additional client content window is different from any other new additional client content windows; and compare the new additional client fingerprint and the new reference fingerprint;

in response to the new additional client fingerprint not matching the reference fingerprint within the specified tolerance, determining that the switch from the other content stream to the different content stream has occurred.

12. The client device of claim 7, further comprising a display component configured to displaying the content stream.

13. A non-transitory computer-readable medium storing instructions that, in response to execution by a processor of a client, perform operations comprising:

generating a first client fingerprint of a first client content window of a content stream;

sending the first client fingerprint, over a network, to a fingerprinting system that employs a reference fingerprint database having an index that is invariant to time shifts based upon a time period of the first client content window, wherein the fingerprint database comprises reference fingerprints that cover a larger time period than the time period of the first client content window, wherein respective reference fingerprints start and end by an amount of time later than another reference fingerprint for a same content, wherein the amount of time is the time period of the first client content window; and iteratively performing until it is determined that a switch from the content stream to another content stream has occurred, the following:

receiving, over the network, a reference fingerprint from the fingerprinting system, the reference fingerprint derived from a reference content window from a matching content stream to the content stream, wherein the reference content window is incremented by a specified time period in the matching content stream from a previous reference content window;

generating an additional client fingerprint from an additional client content window of the content stream, wherein the additional client content window is different from the first client content window and any other additional client content windows; and comparing the additional client fingerprint and the reference fingerprint;

in response to the additional client fingerprint not matching the reference fingerprint within a specified tolerance, determining that the switch from the content stream to the other content stream has occurred.

14. The non-transitory computer-readable medium of claim 13, wherein the specified time period is the time period of the first client content window.

* * * * *